United States Patent
Taguchi et al.

[11] Patent Number: 5,874,376
[45] Date of Patent: Feb. 23, 1999

[54] MAGNETIC DISK SUBSTRATE

[75] Inventors: Tomoyuki Taguchi; Hideki Kawai; Tohru Ohara; Ikuo Kuriyama; Hajimu Wakabayashi, all of Hyogo, Japan

[73] Assignee: Yamamura Glass Co., Ltd., Hyogo, Japan

[21] Appl. No.: 912,478

[22] Filed: Aug. 18, 1997

Related U.S. Application Data

[62] Division of Ser. No. 773,260, Dec. 23, 1996, Pat. No. 5,691,256.

Foreign Application Priority Data

Dec. 28, 1995 [JP] Japan ..................... 7-353194
Dec. 10, 1996 [JP] Japan ..................... 8-346787

[51] Int. Cl.⁶ .......................... C03C 3/097; C03C 10/12
[52] U.S. Cl. ............................ 501/63; 501/5; 501/7; 428/694 ST; 428/694 SG
[58] Field of Search .............. 428/694 ST, 694 SG; 501/63, 5, 7

[56] References Cited

U.S. PATENT DOCUMENTS

| | | | |
|---|---|---|---|
| 4,755,488 | 7/1988 | Nagashima ................. | 501/7 |
| 5,391,522 | 2/1995 | Goto et al. ................. | 501/63 |
| 5,567,217 | 10/1996 | Goto et al. ................. | 501/7 |
| 5,591,682 | 1/1997 | Goto ......................... | 501/63 |

FOREIGN PATENT DOCUMENTS

| | | |
|---|---|---|
| 6-329439 | 11/1994 | Japan . |
| 7-101750 | 4/1995 | Japan . |
| 1151770 | 5/1969 | United Kingdom . |

*Primary Examiner*—Karl Group
*Attorney, Agent, or Firm*—Young & Thompson

[57] ABSTRACT

A glass composition for magnetic disk substrates comprising as oxides: from 66 to 80% by weight of $SiO_2$, from 5 to 15% by weight of $Al_2O_3$, from 3 to 8.5% by weight of $Li_2O$, from 0 to 3% by weight of $Na_2O$, from 0 to 3% by weight of $K_2O$, from 0.5 to 8% by weight of $TiO_2$, from 3.5 to 8% by weight of $ZrO_2$, from 0.5 to 3% by weight of $P_2O_5$, from 0 to 2% by weight of $Sb_2O_3$, and from 0 to 2% by weight of $As_2O_3$, and having a theoretical optical basicity of 0.548 or less; a magnetic disk substrate which is prepared by forming and polishing the above glass composition, followed by chemically strengthening the polished substrate by ion exchange or by forming, heat treating, and polishing the above composition and contains $Li_2O.2SiO_2$ and/or spodumene as the main crystalline phase. The glass composition for magnetic disk substrates can easily be formed, can easily be polished after crystallization of the glass by heat treatment or chemically strengthened by ion exchange of the glass after forming and polishing, and is used for preparing magnetic disk substrates which has excellent chemical durability, mechanical strength, heat resistance, surface flatness, and surface smoothness, and shows little degradation of magnetic film characteristics by alkali migration.

18 Claims, No Drawings

MAGNETIC DISK SUBSTRATE

This application is a division of application Ser. No. 08/773,260, filed Dec. 23, 1996 now U.S. Pat. No. 5,691, 256.

FIELD OF THE INVENTION

The present invention relates to a glass composition for magnetic disk substrates and a magnetic disk substrate. More particularly, the present invention relates to a glass composition for magnetic disk substrates which can easily be formed, can easily be polished by precipitation of at least one kind selected from the group consisting of $Li_2O.2SiO_2$ and spodumene as the main crystalline phase by heat treatment of the glass or chemically strengthened by ion exchange of the glass after forming and polishing, and is used for preparing magnetic disk substrates which have excellent chemical durability, mechanical strength, heat resistance, surface flatness, and surface smoothness, and are suitable for hard disks of computers, and a magnetic disk substrate prepared from the above glass composition.

PRIOR ART OF THE INVENTION

Magnetic disks are mainly used as recording media of computers. Aluminum alloys have heretofore been used as the material of magnetic disk substrates. However, in the recent trend for a smaller size, a thinner thickness, and a higher recording density of magnetic disks, a higher surface flatness and a higher surface smoothness are increasingly desired. Aluminum alloys cannot satisfy the desire, and a material for magnetic disk substrates which can replace aluminum alloys is required.

The properties required for a magnetic disk substrate are flatness and smoothness of the disk surface, high strength, high hardness, chemical durability, migration resistance, and heat resistance of the disk substrate, and the like. Because aluminum alloys are inferior in strength and hardness, it is necessary that the thickness of the disk is increased and the surface is hardened. When the thickness of the disk is not increased, the following problem arises. Undulation is formed on the disk, and the surface flatness becomes inferior. As a result, the magnetic head more frequently clashes into the disk to cause plastic deformation of the disk, and data crush takes place. Therefore, the flying height (the distance between the magnetic head and the magnetic disk) cannot be decreased, and the recording density cannot be increased. Moreover, when the magnetic film is made of platinum system alloys, a phenomenon that an electric potential is induced between the substrate of an aluminum alloy and the magnetic film, and the magnetic film is corroded because of the electrolytic corrosion occurs.

As the substrate which can solve these problems of the aluminum alloy substrates, glass substrates for magnetic disks have been developed. The glass substrates are generally classified into two types which are the ion exchange type and the glass-ceramic type.

Glass substrates for magnetic disks of the ion exchange type generally contain a large amount of alkali components in the glass, and a phenomenon that the alkali components migrate to the surface of the substrate to deteriorate the magnetic film characteristics frequently takes place.

Glass substrates for magnetic disks of the glass-ceramic type have been developed to improve the drawbacks of the aluminum alloy substrates and the glass substrates of the ion exchange type. Various glass compositions have been proposed for this purpose. Glass-ceramics of the $LiO_2$—$SiO_2$ type proposed in Japanese Patent Application Laid-Open No. Showa 62(1987)-72547, Japanese Patent Application Laid-Open No. Heisei 4(1992)-144938, Japanese Patent Application Laid-Open No. Heisei 6(1994)-329440, and Japanese Patent Application Laid-Open No. Heisei 7(1995) -157331 contain large amounts of alkali components in the glass compositions. In these glass compositions, migration of alkali ions can be suppressed because some portion of the alkali components are confined into precipitated crystals. However, a considerable amount of the alkali components still remains in the matrix glass which is not crystalline. This situation causes the possibility that properties of a magnetic film are deteriorated by the alkali migration in a manner similar to those of glass substrates of the ion exchange type, and satisfying the future requirement to provide thinner films becomes difficult. Particularly, the $Li_2O.SiO_2$ (lithium metasilicate) crystal proposed in Japanese Patent Application Laid-Open No. Showa 62(1987)-72547 has very poor chemical durability, and there is the the magnetic film characteristics are deteriorated by the alkali migration. The glass-ceramic of the $Li_2O$—$Al_2O_3$—$SiO_2$ type proposed in Japanese Patent Application Laid-Open No. Heisei 6(1992) -329439 requires a high temperature of 1550° C. or higher for melting, and melting and forming cannot easily be conducted. The glass-ceramic of the $Li_2O$—$Al_2O_3$—$SiO_2$ type proposed in Japanese Patent Application Laid-Open No. Heisei 7(1995)-247138 has a drawback in that the chemical durability is inferior because of the small content of $SiO_2$ in the glass composition.

SUMMARY OF THE INVENTION

The present invention has an object of providing a glass composition for magnetic disk substrates which can easily be formed, can easily be polished after crystallization of the glass by heat treatment or chemically strengthened by ion exchange of the glass after forming and polishing, and is used for preparing magnetic disk substrates which have excellent chemical durability, mechanical strength, heat resistance, surface flatness, and surface smoothness, and shows little degradation of the magnetic film characteristics by the alkali migration, and another object of providing a magnetic disk substrate prepared from the glass composition.

As the result of extensive studies undertaken by the present inventors to achieve the above objects, it was discovered that a glass composition which has a theoretical optical basicity of 0.548 or less, can be strengthened by ion exchange, and precipitates at least one type selected from the group consisting of $Li_2O.2SiO_2$ and spodumene as the main crystalline phase by heat treatment can easily be formed and polished and provides magnetic disk substrates having excellent chemical and physical properties. The present invention has been completed on the basis of the discovery.

Accordingly, the present invention provides:

(1) A glass composition for magnetic disk substrates comprising, expressed in terms of weight percent on the oxide basis: from 66 to 80% by weight of $SiO_2$, from 5 to 15% by weight of $Al_2O_3$, from 3 to 8.5% by weight of $Li_2O$, from 0 to 3% by weight of $Na_2O$, from 0 to 3% by weight of $K_2O$, from 0.5 to 8% by weight of $TiO_2$, from 3.5 to 8% by weight of $ZrO_2$, from 0.5 to 3% by weight of $P_2O_5$, from 0 to 2% by weight of $Sb_2O_3$, and from 0 to 2% by weight of $As_2O_3$, wherein the total of the contents of $Li_2O$, $Na_2O$, and $K_2O$ is from 3 to 10% by weight, and having a theoretical optical basicity of 0.548 or less;

(2) A glass composition for magnetic disk substrates comprising, expressed in terms of weight percent on the oxide basis: from 66 to 75% by weight of $SiO_2$, from 5.5 to 10% by weight of $Al_2O_3$, from 4 to 8.5% by weight of $Li_2O$, from 0 to 2% by weight of $Na_2O$, from 0 to 2% by weight of $K_2O$, from 2 to 6% by weight of $TiO_2$, from 3.8 to 6.5% by weight of $ZrO_2$, from 1 to 2.5% by weight of $P_2O_5$, from 0 to 2% by weight of $Sb_2O_3$, and from 0 to 2% by weight of $As_2O_3$, wherein the total of the contents of $Li_2O$, $Na_2O$ and $K_2O$ is from 4 to 9% by weight, and having a theoretical optical basicity of 0.548 or less;

(3) A glass composition for magnetic disk substrates comprising, expressed in terms of weight percent on the oxide basis: from 66 to 75% by weight of $SiO_2$, from 5.5 to 7.5% by weight of $Al_2O_3$, from 5 to 8.5% by weight of $Li_2O$, from 0 to 2% by weight of $Na_2O$, from 0 to 2% by weight of $K_2O$, from 2 to 4% by weight of $TiO_2$, from 4.1 to 6% by weight of $ZrO_2$, from 1 to 2.5% by weight of $P_2O_5$, from 0 to 1% by weight of $Sb_2O_3$, and from 0 to 1% by weight of $As_2O_3$, wherein the total of the contents of $Li_2O$, $Na_2O$ and $K_2O$ is from 5 to 9% by weight, and having a theoretical optical basicity of 0.548 or less;

(4) A magnetic disk substrate prepared by forming and polishing a glass composition for magnetic disk substrates described in any of (1) to (3) and strengthening the formed and polished glass composition by ion exchange of alkali metal ions in the surface layer of the glass composition for alkali metal ions having larger ionic radii at a temperature of from 350° to 550° C.;

(5) A magnetic disk substrate which is prepared by forming, heat treating, and polishing a glass composition for magnetic disk substrates described in any of (1) to (3) and has a main crystalline phase comprising at least one kind selected from the group consisting of $Li_2O.2SiO_2$ and spodumene;

(6) A magnetic disk substrate which is prepared by forming, heat treating, and polishing a glass composition comprising, expressed in terms of weight percent on the oxide basis: from 66 to 80% by weight of $SiO_2$, from 5.5 to 10% by weight of $Al_2O_3$, from 3 to 8.5% by weight of $Li_2O$, from 0 to 3% by weight of $Na_2O$, from 0 to 3% by weight of $K_2O$, from 0.5 to 8% by weight of $TiO_2$, from 3.5 to 8% by weight of $ZrO_2$, from 0.5 to 3% by weight of $P_2O_5$, from 0 to 2% by weight of $Sb_2O_3$, and from 0 to 2% by weight of $As_2O_3$, wherein the total of the contents of $Li_2O$, $Na_2O$ and $K_2O$ is from 3 to 10% by weight, and has a main crystalline phase comprising at least one kind selected from the group consisting of $Li_2O.2SiO_2$ and spodumene;

(7) A magnetic disk substrate described in any of (5) and (6), wherein the total degree of crystallization is 20% by volume or more;

(8) A glass composition for magnetic disk substrates described in any of (1) to (3), wherein decrease in weight is $6 \times 10^{-7}$ $g/cm^2 \cdot h$ or less in a water elution test of a glass in accordance with the grain test for chemical durability; and (9) A magnetic disk substrate described in any of (4) to (7), wherein decrease in weight is $6 \times 10^{-7} g/cm^2 \cdot h$ or less in a water elution test of a glass or a glass-ceramic in accordance with the grain test for chemical durability.

DETAILED DESCRIPTION OF THE INVENTION

The glass composition for magnetic disk substrates comprises as oxides from 66 to 80% by weight of $SiO_2$, from 5 to 15% by weight of $Al_2O_3$, from 3 to 8.5% by weight of $Li_2O$, from 0 to 3% by weight of $Na_2O$, from 0 to 3% by weight of $K_2O$, from 0.5 to 8% by weight of $TiO_2$, from 3.5 to 8% by weight of $ZrO_2$, from 0.5 to 3% by weight of $P_2O_5$, from 0 to 2% by weight of $Sb_2O_3$, and from 0 to 2% by weight of $As_2O_3$, wherein the total of the contents of $Li_2O$, $Na_2O$ and $K_2O$ is from 3 to 10% by weight, and has a theoretical optical basicity of 0.548 or less. The glass composition for magnetic disk substrates of the present invention can optionally comprise oxides, such as 0 to 5% by weight of $B_2O_3$, 0 to 8% by weight of MgO, 0 to 5% by weight of CaO, 0 to 5% by weight of SrO, 0 to 5% by weight of BaO, 0 to 5% by weight of ZnO, and 0 to 3% by weight of PbO.

In the composition of the present invention, $SiO_2$ is the glass network-former and a component of $Li_2O.2SiO_2$ and spodumene ($Li_2O.Al_2O_3.4SiO_2$) which constitute the main crystalline phase when the glass is heat treated. When the content of $SiO_2$ is less than 66% by weight, keeping the theoretical optical basicity of the glass at 0.548 or less is difficult to cause decrease in the chemical durability, and moreover there is the possibility that precipitation of the above crystals becomes difficult when the glass is the crystallized. When the content of $SiO_2$ is more than 80% by weight, the melting temperature is excessively high, and there is the possibility that the production becomes difficult. The content of $SiO_2$ is preferably 66 to 75% by weight when the productivity is taken into consideration.

In the composition of the present invention, $Al_2O_3$ is an intermediate oxide of the glass and is a component of spodumene which constitutes the main crystalline phase when the glass is heat treated. When the content of $Al_2O_3$ is less than 5% by weight, the chemical durability is decreased. When the content of $Al_2O_3$ is more than 15% by weight, the melting temperature is excessively high, and there is the possibility that the production becomes difficult. The content of $Al_2O_3$ is preferably 5.5 to 10% by weight, more preferably 5.5 to 7.5% by weight, when the chemical durability and the productivity are taken into consideration.

In the composition of the present invention, $Li_2O$ plays the role of the flux. When the glass is strengthened by the ion exchange, the lithium ion is the smallest ion among alkali metal ions, and the glass can be strengthened by the ion exchange for alkali metal ions having larger ionic radii, such as sodium ion and potassium ion. When the glass is heat treated, $Li_2O$ is a component of $Li_2O.2SiO_2$ and spodumene which constitutes the main crystalline phase. When the content of $Li_2O$ is less than 3% by weight, the melting temperature is excessively high, and when the glass is strengthened by the ion exchange, there is the possibility that the properties are not improved because of the difficulty in the ion exchange. When the glass is heat treated, there is the possibility that precipitation of the crystals of $Li_2O.2SiO_2$ and spodumene becomes difficult. When the content of $Li_2O$ is more than 8.5% by weight, decreasing the theoretical optical basicity of the glass to 0.548 or less is difficult. This causes decrease in the chemical durability and the migration resistance, and there is the possibility that the magnetic film characteristics are adversely affected. The content of $Li_2O$ is preferably 4 to 8.5% by weight, more preferably 5 to 8.5, when the productivity, the amount of the ion exchange, the chemical durability, and the migration resistance are taken into consideration.

In the composition of the present invention, $Na_2O$ and $K_2O$ are the fluxes and components which can improve the melting property of the composition. $Na_2O$ is also a component which strengthens the glass by ion exchange of the sodium ion for alkali metal ions having larger ionic radii, such as potassium ion. When the chemical durability and the migration resistance of magnetic disk substrates are taken into consideration, using a plurality of alkali components by using these alkali components in combination with $Li_2O$ is preferred to using $Li_2O$ alone so that decrease in the chemical durability and the alkali migration are prevented. When the content of $Na_2O$ or the content of $K_2O$ is more than 3% by weight or the total of the contents of $Li_2O$, $Na_2O$, and $K_2O$ is more than 10% by weight, keeping the theoretical optical basicity of the glass to 0.548 or less becomes difficult. This causes decrease in the chemical durability, and moreover there is the possibility that the migration resistance is decreased. When the chemical durability, the migration resistance, and the theoretical optical basicity of the glass are taken into consideration, the content of $Na_2O$ and the content of $K_2O$ are preferably each 2% by weight or less. The total of the contents of $Li_2O$, $Na_2O$, and $K_2O$ are preferably 4 to 9% by weight, more preferably 5 to 9% by weight.

In the composition of the present invention, $TiO_2$, $ZrO_2$, and $P_2O_5$ play the role of the nuclear-forming agent. Moreover, $TiO_2$ plays the role of the flux and when laser texturing is conducted, also plays an important role as the component which induces change in the surface structure of the magnetic disk substrates by sensitive response to laser beams. When the content of $TiO_2$ is less than 0.5% by weight, the effects of $TiO_2$ as the nuclear-forming agent, the flux, and the component showing the sensitive response to laser beams are poor. When the content of $TiO_2$ is more than 8% by weight, there is the possibility that devitrification tends to take place during forming of the glass. When the effect as the nuclear-forming agent, the effect as the flux, and the effect as the component showing the sensitive response to laser beams, and devitrification are taken into consideration, the content of $TiO_2$ is preferably 2 to 6% by weight, more preferably 2 to 4% by weight.

$ZrO_2$ has also the function of remarkably increasing the chemical durability. However, when the content of $ZrO_2$ is less than 3.5% by weight, there is the possibility that the improvement in the chemical durability is not obtained. When the content of $ZrO_2$ is more than 8% by weight, there is the possibility that $ZrO_2$ is not completely melted, and batch stones remain in the glass. When the effect as the nuclear-forming agent, the chemical durability, and the melting property are taken into consideration, the content of $ZrO_2$ is preferably 3.8 to 6.5% by weight, more preferably 4.1 to 6% by weight.

$P_2O_5$ has the function of the flux, particularly the function of remarkably improving the difficulty in melting of $ZrO_2$. When the content of $P_2O_5$ is less than 0.5% by weight, the effect as the nuclear-forming agent and the effect of improving the difficulty in melting of $ZrO_2$ are poor. When the content of $P_2O_5$ is more than 3% by weight, there is the possibility that corrosion of a melting crucible is increased. When the effect as the nuclear-forming agent, the effect as the flux, and particularly the effect of improving the difficulty in melting of $ZrO_2$ and the corrosion of a melting crucible are taken into consideration, the content of $P_2O_5$ is preferably 1 to 2.5% by weight.

In the composition of the present invention, $Sb_2O_3$ and $As_2O_3$ play the role of the clarifying agent. Either in the single use of $Sb_2O_3$ or $As_2O_3$ or in the combined use of $Sb_2O_3$ and $As_2O_3$, when the content of $Sb_2O_3$, the content of $As_2O_3$, or the total of the contents of $Sb_2O_3$ and $As_2O_3$ is 2% by weight or less, the clarifying effect is sufficiently exhibited although there is the possibility that the effect as the clarifying agent is poor when the content of $Sb_2O_3$, the content of $As_2O_3$, or the total of the contents of $Sb_2O_3$ and $As_2O_3$ is less than 0.1% by weight. Although $As_2O_3$ can be used as the clarifying agent alone or in combination with $Sb_2O_3$, it is preferred that $As_2O_3$ is not used in view of the environment. When the clarifying effect is taken into consideration, the total of the contents of $Sb_2O_3$ and $As_2O_3$ is preferably 0.2 to 1% by weight.

$B_2O_3$, ZnO, and PbO which are optionally comprised in the composition of the present invention have the function of the flux. When the content of $B_2O_3$ is more than 5% by weight, the chemical durability is decreased, and when the composition is heat treated, there is the possibility that the crystallization is suppressed. The content of $B_2O_3$ is preferably 3.5% by weight or less. ZnO has the function of increasing the chemical durability. When the content of ZnO is more than 5% by weight, there is the possibility that the amount of precipitated crystals after heat treatment is decreased. The content of ZnO is preferably 4.5% by weight or less. PbO remarkably shows the function of the flux. However, it is preferred that PbO is not used in view of the environment. When PbO is used, a content of more than 3% by weight causes decrease in the chemical durability, and when the glass is heat treated, there is the possibility that the amount of precipitated crystals are decreased. The content of PbO is preferably 1.5% by weight or less.

MgO, CaO, SrO, and BaO which are optionally comprised in the composition of the present invention are the glass network-modifiers and have the function of widening the working temperature range. Particularly, MgO has the function of increasing the chemical durability. When the content of MgO is more than 8% by weight, or when the content of CaO, SrO, or BaO is more than 5% by weight, the glass is excessively stabilized, and there is the possibility that the amount of the precipitated crystals is decreased. When the amount of the precipitated crystals is taken into consideration, the content of MgO is preferably 5% by weight or less, and the contents of CaO, SrO, and BaO are each preferably 3% by weight or less.

For texturing of the magnetic disk substrates, laser beams are sometimes used as one of the methods. When laser beams are used, additives having absorption at the wavelength of the used light, for example, an element such as Co, Mn, V, Cr, Cu, Au, Ag, Pt, Mo, Ni, Fe, Te, Ce, Se, Nd, Pr, Sm, Er, and S, or a compound containing these elements, can be contained in the glass composition within the range that the properties of the magnetic disk substrate are not adversely affected.

The glass composition for magnetic disk substrates of the present invention has a theoretical optical basicity of 0.548 or less. When the theoretical optical basicity of the glass composition has such a low value, the chemical durability which is the necessary and important property for a magnetic disk substrate is excellent even when a small amount of alkali is contained in the glass composition, and a magnetic disk substrate having a high reliability can be obtained. In the present invention, the theoretical optical basicity of the glass composition for magnetic disk substrates is preferably 0.544 or less, more preferably 0.540 or less.

The theoretical optical basicity of a glass is described in the paper of J. A. Duffy and M. D. Ingram published in Physics and Chemistry of Glasses, Volume 16, Number 6, Page 119 and Journal of Inorganic and Nuclear Chemistry, Volume 37, Page 1203, 1975. The theoretical optical basicity $\Lambda$ of a glass is calculated in accordance with the following equation (1):

$$\Lambda = \Sigma\{(z_i \times r_i)/2\gamma_i\} \qquad (1)$$

In the above equation, $z_i$ represents the oxidation number of the cation i in each oxide component, $r_i$ represents the number of the cation i in each oxide component (namely the number of cation i in a glass) relative to the total number of oxygen in a glass, and $\gamma_i$ represents the basicity moderating parameter of cation i. $\gamma_i$ can be obtained from the electronegativity $\chi_i$ of L. Pauling in accordance with the following equation:

$$\gamma_i = 1.36 \times (\chi_i - 0.26)$$

The theoretical optical basicity of a glass is thus expressed by the following equation (2):

$$\Lambda = \Sigma\{(z_i \times r_i)/(2.72 \times \chi_i - 0.707)\} \quad (2)$$

As an example, $\Lambda$ is calculated with a glass having the composition: $SiO_2$: 72.0% by mol, $Al_2O_3$: 3.6% by mol, $Li_2O$: 10.3% by mol, $K_2O$: 1.0% by mol, $TiO_2$: 3.4% by mol, $ZrO_2$: 2.1% by mol, $P_2O_5$: 1.0% by mol, MgO: 3.0% by mol, CaO: 2.1% by mol, and ZnO: 1.5% by mol. As the values of $\chi_i$, values of the electronegativity of L. Pauling listed in "Handbook of Chemistry, Basic Chemistry, the Third Edition" (published by Maruzen Co., Ltd., 1984), Volume II, Page 589, are used. The values of $z_i$ obtained from the structure of the oxides and the values of $\chi_i$ as the electronegativity of L. Pauling are shown in Table 1.

TABLE 1

|  | $z_i$ | $\chi_i$ |
|---|---|---|
| $SiO_2$ | 4 | 1.8 |
| $Al_2O_3$ | 3 | 1.5 |
| $Li_2O$ | 1 | 1.0 |
| $K_2O$ | 1 | 0.8 |
| $TiO_2$ | 4 | 1.5 |
| $ZrO_2$ | 4 | 1.4 |
| $P_2O_5$ | 5 | 2.1 |
| Mgo | 2 | 1.2 |
| CaO | 2 | 1.0 |
| ZnO | 2 | 1.6 |

The values of $r_i$ are obtained in the next step. In order to obtain the values of $r_i$, the total number of oxygen in the glass is calculated. The total number of oxygen is obtained as the sum of the number of oxygen in the individual oxide components composed of the the glass as shown in the following:

$SiO_2$: 0.720×2=1.440

$Al_2O_3$: 0.036×3=0.108

$Li_2O$: 0.103×1=0.103

$K_2O$: 0.010×1=0.010

$TiO_2$: 0.034×2=0.068

$ZrO_2$: 0.021×2=0.042

$P_2O_5$: 0.010×5=0.050

MgO: 0.030×1=0.030

CaO: 0.021×1=0.021

ZnO: 0.015×1=0.015 the total 1.887

The values of $r_i$ of each cation can be obtained as the number of each cation based on the obtained total number of oxygen set as 1. For example, the value of $r_i$ with respect to $SiO_2$ can be obtained in accordance with the following equation:

$$SiO_2: (0.720 \times 1)/1.887 = 0.3816$$

The results of similar calculations of the values of $r_i$ with respect to each oxide are shown in Table 2.

TABLE 2

|  | $r_i$ |
|---|---|
| $SiO_2$ | 0.3816 |
| $Al_2O_3$ | 0.0382 |
| $Li_2O$ | 0.1092 |
| $K_2O$ | 0.0106 |
| $TiO_2$ | 0.0180 |
| $ZrO_2$ | 0.0111 |
| $P_2O_5$ | 0.0106 |
| MgO | 0.0159 |
| CaO | 0.0111 |
| ZnO | 0.0079 |

When the theoretical optical basicity is calculated in accordance with the equation (2) by using the values of $z_i$ and $\chi_i$ shown in Table 1 and the values of $r_i$ shown in Table 2, the theoretical optical basicity of the glass composition used as the example can be obtained as 0.5337.

The glass composition for magnetic disk substrates of the present invention can be treated by ion exchange for strengthening in accordance with a conventional process, such as dipping of the glass composition into a molten salt of $NaNO_3$ or $KNO_3$, after the glass has been melted, formed, and polished. The temperature of the treatment is selected between about 350° C. which is higher than the melting point of $NaNO_3$ or $KNO_3$ and about 550° C. which is lower than the glass transition temperature of the glass composition. The time of the ion exchange treatment is preferably 10 hours or more. By the ion exchange treatment, lithium ion in the surface layer of the glass is replaced with ions having larger ionic radii, such as sodium ion and potassium ion, and when $Na_2O$ is contained in the glass, sodium ion is replaced with an ion having a still larger ion radius, such as potassium ion. Because a compression layer is formed at the surface of the glass by this ion exchange, a magnetic disk substrate of a strengthened glass having a high strength can be obtained.

In the glass composition for magnetic disk substrates of the present invention, at least one kind selected from the group consisting of $Li_2O.2SiO_2$ and spodumene is precipitated as the main crystalline phase. The crystal of $Li_2O.2SiO_2$ has a cylindrical shape and a high strength. However, because the workability in polishing is inferior when the crystal grain size is larger than 1 μm, it is preferred that the crystal grain size is kept at 1 μm or smaller by using nuclear-forming agents, such as $TiO_2$, $ZrO_2$, and $P_2O_5$, and by a suitable treatment for crystallization. It is more preferable that the crystal grain size is 0.5 μm or smaller. The crystal of spodumene is a granular crystal, and a crystal as fine and uniform as the $Li_2O.2SiO_2$ crystal can be obtained by using nuclear-forming agents, such as $TiO_2$, $ZrO_2$, and $P_2O_5$, and by a suitable treatment for crystallization. To achieve a high recording density which will be required for future magnetic disks, very high surface precision, namely very high surface smoothness, is required for disk substrates. For this purpose, it is preferred that the main crystalline phase is composed of $Li_2O.2SiO_2$, and crystals of spodumene are not precipitated. When the main crystalline phase is composed of $Li_2O.2SiO_2$, and crystals of spodumene are not precipitated, the content of $Al_2O_3$ in the remaining glass matrix is higher than that before the crystallization treatment, and the chemical durability of the glass phase is increased. As the result, the difference in the chemical durability between the crystalline phase and the matrix glass phase is decreased to cause smaller difference in the speed of polishing between the two phases. Therefore, a disk substrate having a very high surface smoothness can be obtained from a glass-ceramic in which fine crystals of $Li_2O.2SiO_2$ are precipitated.

In contrast, when a large amount of spodumene is precipitated, the content of $Al_2O_3$ in the remaining glass matrix is decreased from that before the crystallization treatment, and the chemical durability of the glass phase is somewhat decreased. The chemical durability of the spodumene crystal is higher than that of $Li_2O.2SiO_2$. Because of these reasons, the difference in the chemical durability between the crystalline phase and the matrix glass phase is increased. As the result, the difference in the speed of polishing between the two phases is somewhat increased, and formation of textures simultaneously with polishing is made possible.

Therefore, by controlling the amount and the size of the spodumene crystal and the ratio of the spodumene crystal to the $Li_2O.2SiO_2$ crystal, various types of substrate surface ranging from a very smooth substrate surface to a substrate surface having a desired texture for an application can be obtained as desired. It is also possible by controlling the ratio of the spodumene crystal to the $Li_2O.2SiO_2$ crystal that the thermal expansion coefficient of a magnetic disk substrate is controlled between $80 \times 10^{-7}$ to $110 \times 10^{-7}/°C$. The $Li_2O.2SiO_2$ crystal becomes the largest amount of crystalline phase when the final temperature of the crystallization treatment is adjusted to about 720° C. or lower. The spodumene crystal becomes the largest amount of crystalline phase when the final temperature of the crystallization treatment is adjusted to about 730° C. or higher.

In the magnetic disk substrate of the present invention, it is preferred that the total degree of crystallization which is the total of the contents of the main crystalline phase comprising the $Li_2O.2SiO_2$ crystal and the spodumene crystal and other crystals is 20% by volume or more. The degree of crystallization is measured by the powder X-ray diffraction in accordance with the working curve method. When the total degree of crystallization is less than 20% by volume, there is the possibility that satisfactory mechanical strength as a magnetic disk substrate is not obtained.

In the glass composition for magnetic disk substrates of the present invention, when the glass composition is heat treated, lithium feldspars ($Li_2O.Al_2O_3.6SiO_2$), α-quartz, β-cristobalite ($SiO_2$), and the like are occasionally precipitated as the subordinate crystalline phases in addition to the main crystalline phase. The properties of the composition of the present invention is not adversely affected by the precipitation of these subordinate crystalline phases. α-Quartz exhibits such a behavior that the precipitation begins at about 650° C., and the amount of the crystal is decreased when the precipitation of spodumene begins.

The glass composition for magnetic disk substrates of the present invention preferably shows a decrease in weight of $6 \times 10^{-7}$ g/cm²·h or less in the water elution test of a glass in accordance with the grain test for chemical durability. When the decrease in weight is $6 \times 10^{-7}$ g/cm²·h or less in the water elution test of a glass in accordance with the grain test for chemical durability, a magnetic disk substrate excellent in the chemical durability, which is the necessary and important property for a magnetic disk substrate, and having a high degree of reliability can be obtained even when a small amount of alkali is contained in the glass. The decrease in weight in the water elution test of a glass in accordance with the grain test for chemical durability is more preferably $4 \times 10^{-7}$ g/cm²·h or less, still more preferably $2 \times 10^{-7}$ g/cm²·h or less.

The magnetic disk substrate of the present invention preferably shows a decrease in weight of $6 \times 10^{-7}$ g/cm²·h or less in the water elution test of a glass or a glass-ceramic (these are referred to as a glass in the following descriptions) in accordance with the grain test for chemical durability. When the decrease in weight is $6 \times 10^{-7}$ g/cm²·h or less in the water elution test of a glass in accordance with the grain test for chemical durability, a magnetic disk substrate excellent in the chemical durability, which is the necessary and important property for a magnetic disk substrate, and having a high degree of reliability can be obtained even when a small amount of alkali is contained in the glass. The decrease in weight in the water elution test of a glass in accordance with the grain test for chemical durability is more preferably $4 \times 10^{-7}$ g/cm²·h or less, still more preferably $2 \times 10^{-7}$ g/cm²·h or less.

The method of the water elution test of a glass or a glass-ceramic (these are referred to as a glass in the following descriptions) in accordance with the grain test for chemical durability used in the present invention is described in the following. A glass is pulverized in a mortar or the like. The glass powder obtained by the pulverization is classified by using standard sieves having a mesh of 1.70 mm and 0.85 mm, and the glass powder which passes through the sieve of 1.70 mm mesh and remains on the sieve of 0.85 mm mesh is used as the sample. The obtained sample of the glass powder is placed in a beaker containing diethyl ether. The content of the beaker is treated by ultrasonic cleaning for 2 to 3 minutes, and the white turbid supernatant liquid is disposed. After the ultrasonic cleaning with diethyl ether is repeated once more, ultrasonic wave cleaning is conducted by using methanol for 2 to 3 minutes, and the supernatant liquid is disposed. The cleaned glass powder is dried at 120° C. for 1 hour while the glass powder is still placed in the beaker and then cooled by being left standing in a desiccator. The obtained glass powder is weighed in such an amount that the weight of the glass powder in terms of gram is the same as the specific gravity which has been measured in advance so that the surface area is kept the same. The thus taken sample of the glass powder is placed in a platinum cage of 70 mesh (0.21 mm). The cage containing the glass powder is dipped into methanol placed in a beaker and treated by ultrasonic cleaning for 2 to 3 minutes. The cleaned cage containing the glass powder is taken out of the beaker, dried at 120° C. for 1 hour, and cooled by being left standing in a desiccator. The cooled platinum cage is weighed with an accuracy of $10^{-5}$ g while the glass powder is still placed in the cage. The cage containing the glass powder is then transferred into a vessel made of Teflon. Into the vessel made of Teflon, 100 ml of ion-exchanged water is placed, and the vessel made of Teflon is closed by a cap made of Teflon. The closed vessel is placed into a thermostat kept at 80° C. in advance, and the thus formed combination is left standing in this condition for 66 hours for the test of water resistance. After 66 hours, the platinum cage which contains the glass powder is taken out of the vessel made of Teflon and treated by ultrasonic cleaning in methanol for 2 to 3 minutes. The cleaned cage containing the glass powder is dried at 120° C. for 1 hour and then cooled by being left standing in a desiccator. The cooled platinum cage containing the glass powder is weighed with the accuracy of $10^{-5}$ g, and decrease in the weight of the glass is obtained from the difference in the weight before and after the test of water resistance. From the decrease in weight thus obtained and the surface area of the glass powder which has been measured in advance by using a specific surface area analyzer, the decrease in weight per 1 cm² per 1 hour is calculated. The test is repeated 3 times with respect to one type of glass, and the average of the obtained results is used as the decrease in weight in the water elution test of the glass.

For preparation of the magnetic disk substrate of the present invention, the glass composition for magnetic disk substrates of the present invention is formed. When the substrate is strengthened by the ion exchange, the formed glass composition is polished and then treated by the ion exchange to prepare the magnetic disk substrate. When the glass composition is crystallized, the formed glass composition is heat treated and then polished to prepare the magnetic disk substrate. The process for forming the glass composition is not particularly limited. For example, the raw materials are melted by heating in a furnace or by the direct electric melting, and then the molten glass is formed by the press forming or by the casting-slicing forming. The process for treating the formed product is not particularly limited. For example, when the heat treatment is conducted, it is preferred for obtaining fine crystals that many crystal nuclei are formed by heat treatment at a relatively low temperature, and then crystals are allowed to grow by increasing the temperature. The process for polishing the product which has been heat treated is not particularly limited. For example, the treated product can be polished with a conventional method using synthetic abrasive grains, such as abrasive grains of synthetic diamond, silicon oxide, silicon carbide, aluminum oxide, zirconium oxide, boron carbide, and c-BN, or natural abrasive grains, such as abrasive grains of natural diamond and cerium oxide.

By using the glass composition for magnetic disk substrates of the present invention, a magnetic disk substrate which has a high strength and a high hardness and is excellent in the chemical durability and the heat resistance can be obtained either when the glass composition is treated by the ion exchange or when the glass composition is heat treated. The composition of the present invention can achieve a high degree of chemical durability because the composition has a low theoretical optical basicity of 0.548 or less and can keep the magnetic film characteristics at the best condition because the composition is excellent in the migration resistance.

To summarized the advantages obtained by the present invention, the glass composition of the present invention can easily be formed and provides magnetic disk substrates having excellent chemical durability, mechanical strength, surface smoothness, surface flatness, and heat resistance, and showing little degradation in the magnetic film characteristics by the alkali migration when the glass composition is chemically strengthened by ion exchange of the alkali metal ions in the surface layer for alkali metal ions having larger ionic radii after the formed glass composition is polished, or when the formed glass composition is crystallized to precipitate the main crystalline phase of $Li_2O \cdot 2SiO_2$ and/or spodumene by heat treatment and then polished.

The present invention is described in more detail in the following with reference to examples. However, the present invention is not limited by the examples.

The raw materials used in the examples and the comparative examples are as follows: $SiO_2$, $Al(OH)_3$, $Li_2CO_3$, $Na_2CO_3$, $K_2CO_3$, $TiO_2$, $ZrO_2$, $AlPO_4$, $Sb_2O_3$, $As_2O_3$, $H_3BO_3$, $Mg(OH)_2$, $CaCO_3$, $SrCO_3$, $BaCO_3$, ZnO, and PbO.

In the examples and the comparative examples, the type of the crystalline phase, the degree of crystallization, the bending strength, and the arithmetical mean roughness Ra were measured in accordance with the following methods.

(1) Type of the crystalline phase

The type of the crystalline phase was measured with a sample of a formed and polished product by using an X-ray diffraction apparatus.

(2) Degree of crystallization

First, a working curve was made for the crystalline phase to be measured. For example, when the crystal of spodumene is measured, $Li_2CO_3$, $Al(OH)_3$, and $SiO_2$ were weighed in such amounts that $LiO_2:Al_2O_3:SiO_2=1:1:4$, i.e., the composition of spodumene. To the weighed compounds, isopropyl alcohol was added, and the mixture was wet mixed for 24 hours. After the mixing, isopropyl alcohol was removed from the mixture, and the remaining mixture was sintered until increase in the peak intensities in the X-ray diffraction was no longer observed to prepare a crystal of spodumene. The crystal of spodumene thus obtained was pulverized and mixed with a mother glass powder showing no precipitation of crystals in various ratios. A working curve was made by measuring the peak intensities of 4 main peaks of these mixtures in the X-ray diffraction.

After a glass was melted, formed, heat treated, and polished, the obtained glass was used as a sample for the measurement of the degree of crystallization. The sample was measured by the X-ray diffraction, and the degree of crystallization was obtained by using the working curve which had been made in advance.

(3) Bending strength

After a formed glass was heat treated, the obtained glass-ceramic was processed in accordance with the method of Japanese Industrial Standard R 1601, or after a formed glass was processed in accordance with the method of Japanese Industrial Standard R 1601, the processed glass was treated by ion exchange, and the bending strength was measured by the three point bending.

(4) Arithmetical mean roughness Ra

The surface of a product obtained after forming and polishing was observed by using an atomic force microscope (a product of DIGITAL INSTRUMENTS Corporation). Five parts were randomly selected in the surface of a sample. At each part, 4 lines were randomly drawn in the field of observation of 10 $\mu$m×10 $\mu$m, and Ra was calculated along each line. The arithmetic roughness Ra was obtained as the average of the 20 measurements in all.

EXAMPLE 1

Materials for the components were weighed and mixed together in such amounts that the glass composition had the following composition: $SiO_2$: 70.0% by weight, $Al_2O_3$: 6.0% by weight, $Li_2O$: 8.0% by weight, $TiO_2$: 2.5% by weight, $ZrO_2$: 4.0% by weight, $P_2O_5$: 1.8% by weight, $Sb_2O_3$: 0.2% by weight, $B_2O_3$: 2.0% by weight, CaO: 2.0% by weight, BaO: 1.5% by weight, and ZnO: 2.0% by weight. The glass composition had the following composition expressed in terms of % by mol: $SiO_2$: 69.87% by mol, $Al_2O_3$: 3.53% by mol, $Li_2O$: 16.05% by mol, $TiO_2$: 1.88% by mol, $ZrO_2$: 1.95% by mol, $P_2O_5$: 0.76% by mol, $Sb_2O_3$: 0.04% by mol, $B_2O_3$: 1.72 % by mol, CaO: 2.14% by mol, BaO: 0.59% by mol, and ZnO: 1.47% by mol. The theoretical optical basicity of the glass composition was 0.5395. The mixture of the materials was placed in a platinum crucible which was in turn placed in an electric furnace. The mixture was melted and stirred at 1,450° C. for 5 hours to obtain a homogeneous molten glass and then formed into a plate of 50×50×5 mm. The obtained plate was annealed and cooled to obtain a formed glass product.

The obtained formed glass product was heat treated at 600° C. for 3 hours and then at 800° C. for 2 hours to precipitate crystals in the glass. Then, the surface of the formed glass-ceramic product was treated by lapping for 30 minutes by using a silicon carbide abrasive grains having an average grain diameter of 10 $\mu$m and then polished for 15 minutes by using a cerium oxide abrasive grains having an average grain diameter of 1 μm to obtain a polished product.

The obtained polished product had spodumene as the crystalline phase 1, $Li_2O \cdot 2SiO_2$ as the crystalline phase 2, and α-quartz as the crystalline phase 3. The degrees of crystallization were 21% by volume in spodumene, 16% by volume in $Li_2O \cdot 2SiO_2$, and 14% by volume in α-quartz. The decrease in weight in the water elution test of glass-ceramic in accordance with the grain test for chemical durability was $4.1 \times 10^{-7}$ $g/cm^2 \cdot h$, the bending strength was 270 MPa, and the arithmetical mean roughness Ra was 18.0 Å.

EXAMPLES 2 to 7

By the same procedures as those conducted in Example 1, glass compositions were formed after melting at a temperature of 1,400° to 1,530° C. for a time of 3 to 24 hours which were selected for each composition and then heat treated under the conditions shown in Table 3. The formed glass-ceramic products thus obtained were polished by the same procedures as those conducted in Example 1.

With the polished products obtained above, the type of the crystalline phase, the degree of crystallization, the decrease in weight in the water elution test of glass-ceramic in accordance with the grain test for chemical durability, the bending strength, and the arithmetical mean roughness Ra were measured. The results are shown in Table 3.

EXAMPLE 8

Materials for the components were weighed and mixed together in such amounts that the glass composition had the following composition: $SiO_2$: 70.0% by weight, $Al_2O_3$: 6.0% by weight, $Li_2O$: 8.0% by weight, $TiO_2$: 2.5% by weight, $ZrO_2$: 4.0% by weight, $P_2O_5$: 1.8% by weight, $Sb_2O_3$: 0.2% by weight, $B_2O_3$: 2.0% by weight, CaO: 2.0% by weight, BaO: 1.5% by weight, and ZnO: 2.0% by weight. The glass composition had the following composition expressed in terms of % by mol: $SiO_2$: 69.87% by mol, $Al_2O_3$: 3.53% by mol, $Li_2O$: 16.05% by mol, $TiO_2$: 1.88% by mol, $ZrO_2$: 1.95% by mol, $P_2O_5$: 0.76% by mol, $Sb_2O_3$: 0.04% by mol, $B_2O_3$: 1.72% by mol, CaO: 2.14% by mol, BaO: 0.59% by mol, and ZnO: 1.47% by mol. The theoretical optical basicity of the glass composition was 0.5395. The mixture of the materials was placed in a platinum crucible which was in turn placed in an electric furnace. The mixture was melted and stirred at 1,450° C. for 5 hours to obtain a homogeneous molten glass and then formed into a plate of 50×50×5 mm. The obtained plate was annealed and cooled to obtain a formed glass product.

The obtained formed glass product was heat treated at 570° C. for 3 hours and then at 670° C. for 2 hours to precipitate crystals in the glass. Then, the surface of the formed glass-ceramic product was treated by lapping for 30 minutes by using a silicon carbide abrasive grains having an average grain diameter of 10 μm and then polished for 15 minutes by using a cerium oxide abrasive grains having an average grain diameter of 1 μm to obtain a polished product.

The obtained polished product had $Li_2O \cdot 2SiO_2$ as the crystalline phase 1 and α-quartz as the crystalline phase 2. The degrees of crystallization were 20% by volume in $Li_2O \cdot 2SiO_2$ and 19% by volume in α-quartz. The decrease in weight in the water elution test of glass-ceramic in accordance with the grain test for chemical durability was $3.8 \times 10^{-7}$ $g/cm^2 \cdot h$, the bending strength was 230 MPa, and the arithmetical mean roughness Ra was 7.0 Å.

EXAMPLES 9 to 14

By the same procedures as those conducted in Example 8, glass compositions were formed after melting at a temperature of 1,400° to 1,530° C. for a time of 3 to 24 hours which were selected for each composition and then heat treated under the conditions shown in Table 3. The formed glass-ceramic compositions thus obtained were polished by the same procedures as those conducted in Example 8.

With the polished products obtained above, the type of the crystalline phase, the degree of crystallization, the decrease in weight in the water elution test of glass-ceramic in accordance with the grain test for chemical durability, the bending strength, and the arithmetical mean roughness Ra were measured. The results are shown in Table 3.

EXAMPLE 15

Materials for the components were weighed and mixed together in such amounts that the glass composition had the following composition: $SiO_2$: 70.0% by weight, $Al_2O_3$: 6.0% by weight, $Li_2O$: 8.0% by weight, $TiO_2$: 2.5% by weight, $ZrO_2$: 4.0% by weight, $P_2O_5$: 1.8% by weight, $Sb_2O_3$: 0.2% by weight, $B_2O_3$: 2.0% by weight, CaO: 2.0% by weight, BaO: 1.5% by weight, and ZnO: 2.0% by weight. The glass composition had the following composition expressed in terms of % by mol: $SiO_2$: 69.87% by mol, $Al_2O_3$: 3.53% by mol, $Li_2O$: 16.05% by mol, $TiO_2$: 1.88% by mol, $ZrO_2$: 1.95% by mol, $P_2O_5$: 0.76% by mol, $Sb_2O_3$: 0.04% by mol, $B_2O_3$: 1.72% by mol, CaO: 2.14% by mol, BaO: 0.59% by mol, and ZnO: 1.47% by mol. The theoretical optical basicity of the glass composition was 0.5395. The mixture of the materials was placed in a platinum crucible which was in turn placed in an electric furnace. The mixture was melted and stirred at 1,450° C. for 5 hours to obtain a homogeneous molten glass and then formed into a plate of 50×50×5 mm. The obtained plate was annealed and cooled to obtain a formed glass product.

The surface of the formed glass product was treated by lapping for 30 minutes by using a silicon carbide abrasive grains having an average grain diameter of 10 μm and then polished for 15 minutes by using a cerium oxide abrasive grains having an average grain diameter of 1 μm to obtain a polished product. The polished product was dipped into a bath of molten sodium nitrate kept at 450° C. for 48 hours, and lithium ion in the surface layer of the glass was exchanged for sodium ion to chemically strengthen the polished product.

The obtained polished product had a decrease in weight in the water elution test of glass in accordance with the grain test for chemical durability of $4.0 \times 10^{-7}$ $g/cm^2 \cdot h$, a bending strength of 280 MPa, and an arithmetical mean roughness Ra of 6.5 Å.

EXAMPLES 16 to 17

By the same procedures as those conducted in Example 15, glass compositions were formed and polished, and the obtained polished products were chemically strengthened by ion exchange under the conditions shown in Table 3.

With the polished products obtained above, the decrease in weight in the water elution test of glass in accordance with the grain test for chemical durability, the bending strength, and the arithmetical mean roughness Ra were measured. The results are shown in Table 3.

TABLE 3-1

| composition | Example 1 | | Example 2 | | Example 3 | |
|---|---|---|---|---|---|---|
| | % by wt. | % by mol | % by wt. | % by mol | % by wt. | % by mol |
| SiO$_2$ | 70.0 | 69.87 | 78.0 | 80.98 | 69.0 | 71.56 |
| Al$_2$O$_3$ | 6.0 | 3.53 | 8.0 | 4.89 | 7.0 | 4.28 |
| Li$_2$O | 8.0 | 16.05 | 3.5 | 7.30 | 4.0 | 8.34 |
| Na$_2$O | — | — | — | — | — | — |
| K$_2$O | — | — | — | — | 1.5 | 0.99 |
| TiO$_2$ | 2.5 | 1.88 | 0.5 | 0.39 | 7.5 | 5.85 |
| ZrO$_2$ | 4.0 | 1.95 | 4.0 | 2.03 | 3.5 | 1.77 |
| P$_2$O$_5$ | 1.8 | 0.76 | 2.3 | 1.01 | 0.9 | 0.40 |
| Sb$_2$O$_3$ | 0.2 | 0.04 | 0.2 | 0.04 | 0.1 | 0.02 |
| As$_2$O$_3$ | — | — | — | — | — | — |
| B$_2$O$_3$ | 2.0 | 1.72 | — | — | 2.0 | 1.79 |
| MgO | — | — | 1.0 | 1.55 | — | — |
| CaO | 2.0 | 2.14 | — | — | 4.5 | 5.00 |
| SrO | — | — | — | — | — | — |
| BaO | 1.5 | 0.59 | — | — | — | — |
| ZnO | 2.0 | 1.47 | 1.0 | 0.77 | — | — |
| PbO | — | — | 0.5 | 0.14 | — | — |
| theoretical optical basicity | 0.5395 | | 0.5086 | | 0.5331 | |
| condition of treatment | 600° C. × 3h | | 700° C. × 3h | | 650° C. × 3h | |
| | 800° C. × 2h | | 900° C. × 2h | | 850° C. × 2h | |
| crystalline phase 1 | spodumene | | spodumene | | spodumene | |
| crystalline phase 2 | Li$_2$O.2SiO$_2$ | | α-quartz | | α-quartz | |
| crystalline phase 3 | α-quartz | | — | | — | |
| degree of crystallization (% by volume) | | | | | | |
| crystalline phase 1 | 21 | | 25 | | 20 | |
| crystalline phase 2 | 16 | | 15 | | 13 | |
| crystalline phase 3 | 14 | | — | | — | |
| decrease in wt. in water elution test (×10$^{-7}$ g/cm$^2$ · h) | 4.1 | | 0.6 | | 2.7 | |
| bending strength (MPa) | 270 | | 230 | | 200 | |
| arithmetical mean roughness Ra (Å) | 18.0 | | 16.0 | | 14.5 | |

TABLE 3-2

| composition | Example 4 | | Example 5 | | Example 6 | |
|---|---|---|---|---|---|---|
| | % by wt. | % by mol | % by wt. | % by mol | % by wt. | % by mol |
| SiO$_2$ | 73.0 | 73.99 | 66.0 | 69.89 | 67.0 | 67.48 |
| Al$_2$O$_3$ | 8.0 | 4.78 | 14.0 | 8.74 | 8.2 | 4.87 |
| Li$_2$O | 7.0 | 14.27 | 6.0 | 12.78 | 7.8 | 15.80 |
| Na$_2$O | — | — | — | — | — | — |
| K$_2$O | — | — | — | — | — | — |
| TiO$_2$ | 5.0 | 3.81 | 6.0 | 4.78 | 5.3 | 4.01 |
| ZrO$_2$ | 4.0 | 1.98 | 5.0 | 2.58 | 4.0 | 1.97 |
| P$_2$O$_5$ | 2.5 | 1.07 | 2.5 | 1.12 | 2.3 | 0.98 |
| Sb$_2$O$_3$ | 0.5 | 0.10 | 0.5 | 0.11 | 0.2 | 0.04 |
| As$_2$O$_3$ | — | — | — | — | — | — |
| B$_2$O$_3$ | — | — | — | — | — | — |
| MgO | — | — | — | — | 1.9 | 2.85 |
| CaO | — | — | — | — | — | — |
| SrO | — | — | — | — | — | — |
| BaO | — | — | — | — | 1.3 | 0.51 |
| ZnO | — | — | — | — | 2.0 | 1.49 |
| PbO | — | — | — | — | — | — |
| theoretical optical basicity | 0.5298 | | 0.5333 | | 0.5435 | |
| condition of treatment | 650° C. × 3h | | 700° C. × 3h | | 580° C. × 3h | |
| | 740° C. × 2h | | 930° C. × 2h | | 780° C. × 2h | |
| crystalline phase 1 | spodumene | | spodumene | | spodumene | |
| crystalline phase 2 | β-cristobalite | | lithium feldspar | | Li$_2$O.2SiO$_2$ | |
| crystalline phase 3 | — | | — | | β-cristobalite | |
| degree of crystallization (% by volume) | | | | | | |
| crystalline phase 1 | 25 | | 39 | | 24 | |
| crystalline phase 2 | 14 | | 10 | | 16 | |
| crystalline phase 3 | — | | — | | 8 | |
| decrease in wt. in water elution test (×10$^{-7}$ g/cm$^2$ · h) | 0.8 | | 1.1 | | 4.6 | |
| bending strength (MPa) | 210 | | 290 | | 270 | |
| arithmetical mean roughness Ra (Å) | 16.5 | | 23.0 | | 18.0 | |

TABLE 3-3

| composition | Example 7 | | Example 8 | | Example 9 | |
|---|---|---|---|---|---|---|
| | % by wt. | % by mol | % by wt. | % by mol | % by wt. | % by mol |
| SiO$_2$ | 68.7 | 69.05 | 70.0 | 69.87 | 72.0 | 71.70 |
| Al$_2$O$_3$ | 7.0 | 4.15 | 6.0 | 3.53 | 6.0 | 3.52 |
| Li$_2$O | 7.9 | 15.97 | 8.0 | 16.05 | 8.0 | 16.02 |
| Na$_2$O | — | — | — | — | — | — |
| K$_2$O | — | — | — | — | — | — |
| TiO$_2$ | 4.0 | 3.02 | 2.5 | 1.88 | 2.7 | 2.02 |
| ZrO$_2$ | 4.1 | 2.01 | 4.0 | 1.95 | 4.2 | 2.04 |
| P$_2$O$_5$ | 1.8 | 0.77 | 1.8 | 0.76 | 1.8 | 0.76 |
| Sb$_2$O$_3$ | 0.2 | 0.04 | 0.2 | 0.04 | 0.2 | 0.04 |
| As$_2$O$_3$ | — | — | — | — | — | — |
| B$_2$O$_3$ | 1.1 | 0.95 | 2.0 | 1.72 | — | — |
| MgO | — | — | — | — | — | — |
| CaO | 1.9 | 2.05 | 2.0 | 2.14 | 1.8 | 1.92 |
| SrO | — | — | — | — | — | — |
| BaO | 1.3 | 0.51 | 1.5 | 0.59 | 1.3 | 0.51 |
| ZnO | 2.0 | 1.48 | 2.0 | 1.47 | 2.0 | 1.47 |
| PbO | — | — | — | — | — | — |
| theoretical optical basicity | 0.5420 | | 0.5395 | | 0.5408 | |
| condition of treatment | 550° C. × 3h | | 570° C. × 3h | | 580° C. × 3h | |
| | 830° C. × 2h | | 670° C. × 3h | | 660° C. × 3h | |
| crystalline phase 1 | spodumene | | Li$_2$O.2SiO$_2$ | | Li$_2$O.2SiO$_2$ | |
| crystalline phase 2 | Li$_2$O.2SiO$_2$ | | α-quartz | | α-quartz | |
| crystalline phase 3 | α-quartz | | — | | — | |
| degree of crystallization (% by volume) | | | | | | |
| crystalline phase 1 | 20 | | 20 | | 22 | |
| crystalline phase 2 | 13 | | 19 | | 15 | |
| crystalline phase 3 | 10 | | — | | — | |
| decrease in wt. in water elution test (×10$^{-7}$ g/cm$^2$ · h) | 4.2 | | 3.8 | | 0.8 | |
| bending strength (MPa) | 230 | | 230 | | 220 | |
| arithmetical mean roughness Ra (Å) | 15.0 | | 7.0 | | 6.5 | |

TABLE 3-4

| composition | Example 10 | | Example 11 | | Example 12 | |
|---|---|---|---|---|---|---|
| | % by wt. | % by mol | % by wt. | % by mol | % by wt. | % by mol |
| SiO$_2$ | 73.0 | 73.22 | 74.5 | 75.09 | 74.0 | 74.47 |
| Al$_2$O$_3$ | 8.0 | 4.73 | 7.5 | 4.46 | 6.5 | 3.86 |
| Li$_2$O | 7.0 | 14.12 | 5.5 | 11.15 | 6.0 | 12.14 |
| Na$_2$O | — | — | — | — | — | — |
| K$_2$O | — | — | — | — | — | — |
| TiO$_2$ | 3.0 | 2.26 | 3.0 | 2.27 | 3.5 | 2.65 |
| ZrO$_2$ | 4.2 | 2.05 | 5.0 | 2.46 | 4.5 | 2.21 |
| P$_2$O$_5$ | 1.8 | 0.76 | 1.8 | 0.77 | 1.8 | 0.77 |
| Sb$_2$O$_3$ | 0.2 | 0.04 | 0.2 | 0.04 | 0.2 | 0.04 |
| As$_2$O$_3$ | — | — | — | — | — | — |
| B$_2$O$_3$ | — | — | — | — | — | — |

TABLE 3-4-continued

| | | | | | | |
|---|---|---|---|---|---|---|
| MgO | 1.0 | 1.49 | 2.5 | 3.76 | 1.0 | 1.50 |
| CaO | — | — | — | — | 1.5 | 1.62 |
| SrO | — | — | — | — | — | — |
| BaO | — | — | — | — | — | — |
| ZnO | 1.8 | 1.33 | — | — | 1.0 | 0.74 |
| PbO | — | — | — | — | — | — |
| theoretical optical basicity | 0.5321 | | 0.5269 | | 0.5300 | |
| condition of treatment | 590° C. × 4h | | 600° C. × 3h | | 600° C. × 3h | |
| | 690° C. × 3h | | 700° C. × 3h | | 690° C. × 3h | |
| crystalline phase 1 | $Li_2O \cdot 2SiO_2$ | | $Li_2O \cdot 2SiO_2$ | | $Li_2O \cdot 2SiO_2$ | |
| crystalline phase 2 | α-quartz | | α-quartz | | α-quartz | |
| crystalline phase 3 | spodumene | | spodumene | | — | |
| degree of crystallization (% by volume) | | | | | | |
| crystalline phase 1 | 15 | | 13 | | 14 | |
| crystalline phase 2 | 14 | | 13 | | 13 | |
| crystalline phase 3 | 4 | | 1 | | — | |
| decrease in wt. in water elution test (×$10^{-7}$ g/$cm^2 \cdot h$) | 0.7 | | 0.5 | | 0.5 | |
| bending strength (MPa) | 230 | | 220 | | 220 | |
| arithmetical mean roughness Ra (Å) | 10.5 | | 8.5 | | 7.5 | |

TABLE 3-5

| | Example 13 | | Example 14 | | Example 15 | |
|---|---|---|---|---|---|---|
| composition | % by wt. | % by mol | % by wt. | % by mol | % by wt. | % by mol |
| $SiO_2$ | 71.5 | 71.79 | 71.0 | 70.02 | 70.0 | 69.87 |
| $Al_2O_3$ | 6.5 | 3.85 | 6.0 | 3.49 | 6.0 | 3.53 |
| $Li_2O$ | 7.5 | 15.15 | 8.5 | 16.86 | 8.0 | 16.05 |
| $Na_2O$ | — | — | — | — | — | — |
| $K_2O$ | — | — | — | — | — | — |
| $TiO_2$ | 2.7 | 2.04 | 2.8 | 2.08 | 2.5 | 1.88 |
| $ZrO_2$ | 4.2 | 2.06 | 4.5 | 2.16 | 4.0 | 1.95 |
| $P_2O_5$ | 1.8 | 0.77 | 1.7 | 0.71 | 1.8 | 0.76 |
| $Sb_2O_3$ | 0.2 | 0.04 | 0.2 | 0.04 | 0.2 | 0.04 |
| $As_2O_3$ | — | — | — | — | — | — |
| $B_2O_3$ | — | — | 0.5 | 0.43 | 2.0 | 1.72 |
| MgO | — | — | 0.8 | 1.18 | — | — |
| CaO | 1.8 | 1.94 | 1.7 | 1.80 | 2.0 | 2.14 |
| SrO | — | — | — | — | — | — |
| BaO | 1.3 | 0.51 | 1.3 | 0.50 | 1.5 | 0.59 |
| ZnO | 2.5 | 1.85 | 1.0 | 0.73 | 2.0 | 1.47 |
| PbO | — | — | — | — | — | — |
| theoretical optical basicity | 0.5389 | | 0.5447 | | 0.5395 | |
| condition of treatment | 580° C. × 3h | | 560° C. × 4h | | $NaNO_3$ | |
| | 670° C. × 3h | | 660° C. × 4h | | 450° C. × 48h | |
| crystalline phase 1 | $Li_2O \cdot 2SiO_2$ | | $Li_2O \cdot 2SiO_2$ | | — | |
| crystalline phase 2 | α-quartz | | α-quartz | | — | |
| crystalline phase 3 | — | | — | | — | |
| degree of crystallization (% by volume) | | | | | | |
| crystalline phase 1 | 20 | | 25 | | — | |
| crystalline phase 2 | 14 | | 17 | | — | |
| crystalline phase 3 | — | | — | | — | |
| decrease in wt. in water elution test (×$10^{-7}$ g/$cm^2 \cdot h$) | 0.7 | | 1.9 | | 4.0 | |
| bending strength (MPa) | 210 | | 210 | | 280 | |
| arithmetical mean roughness Ra (Å) | 7.0 | | 7.0 | | 6.5 | |

TABLE 3-6

| | Example 16 | | Example 17 | |
|---|---|---|---|---|
| composition | % by wt. | % by mol | % by wt. | % by mol |
| $SiO_2$ | 73.0 | 70.57 | 66.0 | 69.34 |
| $Al_2O_3$ | 7.0 | 3.99 | 5.5 | 3.41 |
| $Li_2O$ | 5.5 | 10.69 | 5.0 | 10.57 |
| $Na_2O$ | — | — | 2.0 | 2.04 |
| $K_2O$ | — | — | — | — |
| $TiO_2$ | 1.5 | 1.09 | 2.0 | 1.58 |
| $ZrO_2$ | 3.5 | 1.65 | 7.0 | 3.59 |
| $P_2O_5$ | 0.8 | 0.33 | 2.7 | 1.20 |
| $Sb_2O_3$ | 0.2 | 0.04 | — | — |
| $As_2O_3$ | — | — | 0.3 | 0.10 |
| $B_2O_3$ | 1.0 | 0.83 | 4.5 | 4.08 |
| MgO | 7.5 | 10.81 | 1.0 | 1.57 |
| CaO | — | — | — | — |
| SrO | — | — | 0.5 | 0.30 |
| BaO | — | — | — | — |
| ZnO | — | — | 2.5 | 1.94 |
| PbO | — | — | 1.0 | 0.28 |
| theoretical optical basicity | 0.5356 | | 0.5245 | |
| condition of treatment | $NaNO_3$ | | $NaNO_3 + KNO_3$ | |
| | 400° C. × 72h | | 400° C. × 60h | |
| crystalline phase 1 | — | | — | |
| crystalline phase 2 | — | | — | |
| crystalline phase 3 | — | | — | |
| degree of crystallization (% by volume) | | | | |
| crystalline phase 1 | — | | — | |
| crystalline phase 2 | — | | — | |
| crystalline phase 3 | — | | — | |
| decrease in wt. in water elution test (×$10^{-7}$ g/$cm^2 \cdot h$) | 3.4 | | 0.9 | |
| bending strength (MPa) | 240 | | 250 | |
| arithmetical mean roughness Ra (Å) | 6.0 | | 5.5 | |

Each of the polished products in Examples 1 to 7 was prepared by forming, heat treating, and polishing the glass compositions of the present invention and had 20% by volume or more of the crystalline phase of spodumene, a decrease in weight in the water elution test of glass-ceramic in accordance with the grain test for chemical durability of 4.6×$10^{-7}$ g/$cm^2 \cdot h$ or less, a bending strength of 200 MPa or more, and an arithmetical mean roughness of 23.0 Å or less. Thus, the products had the advantageous properties as magnetic disk substrates.

Each of the polished products in Examples 8 to 14 was prepared by forming, heat treating, and polishing the glass compositions of the present invention and had 13% by volume or more of the crystalline phase of $Li_2O \cdot 2SiO_2$, a decrease in weight in the water elution test of glass-ceramic in accordance with the grain test for chemical durability of 3.8×$10^{-7}$ g/$cm^2 \cdot h$ or less, a bending strength of 210 MPa or more, and an arithmetical mean roughness of 10.5 Å or less. Thus, the products had the advantageous properties as magnetic disk substrates.

Each of the polished products in Examples 15 to 17 was prepared by forming, and polishing the glass compositions of the present invention and then strengthening the formed and polished glass composition by ion-exchange and had a decrease in weight in the water elution test of glass in accordance with the grain test for chemical durability of 4.0×$10^{-7}$ g/$cm^2 \cdot h$ or less, a bending strength of 240 MPa or more, and an arithmetical mean roughness of 6.5 Å or less. Thus, the products had the advantageous properties as magnetic disk substrates.

COMPARATIVE EXAMPLE 1

Materials for the components were weighed and mixed together in such amounts that the glass composition had the following composition: $SiO_2$: 82.0% by weight, $Al_2O_3$: 5.5% by weight, $Li_2O$: 6.5% by weight, $TiO_2$: 0.5% by weight, $ZrO_2$: 4.0% by weight, $P_2O_5$: 0.5% by weight, $Sb_2O_3$: 0.2% by weight, and MgO: 0.8% by weight. The glass composition had the following composition expressed in terms of % by mol: $SiO_2$: 80.32% by mol, $Al_2O_3$: 3.18% by mol, $Li_2O$: 12.80% by mol, $TiO_2$: 0.37% by mol, $ZrO_2$: 1.91% by mol, $P_2O_5$: 0.21% by mol, $Sb_2O_3$: 0.04% by mol, and MgO: 1.17% by mol. The theoretical optical basicity of the glass composition was 0.5233. The mixture of the materials was placed in a platinum crucible which was in turn placed in an electric furnace and heated. The mixture was not melted even when the temperature reached 1,550° C. because of the excessively large content of $SiO_2$.

COMPARATIVE EXAMPLE 2

Materials for the components were weighed and mixed together in such amounts that the glass composition had the following composition: $SiO_2$: 72.0% by weight, $Al_2O_3$: 3.0% by weight, $Li_2O$: 10.5% by weight, $K_2O$: 2.0% by weight, $ZrO_2$: 3.0% by weight, $P_2O_5$: 1.8% by weight, $Sb_2O_3$: 0.2% by weight, $B_2O_3$: 3.5% by weight, MgO: 2.0% by weight, and BaO: 2.0% by weight. The glass composition had the following composition expressed in terms of % by mol: $SiO_2$: 68.44% by mol, $Al_2O_3$: 1.68% by mol, $Li_2O$: 20.08% by mol, $K_2O$: 1.21% by mol, $ZrO_2$: 1.39% by mol, $P_2O_5$: 0.72% by mol, $Sb_2O_3$: 0.04% by mol, $B_2O_3$: 2.87% by mol, MgO: 2.83% by mol, and BaO: 0.74% by mol. The theoretical optical basicity of the glass composition was 0.5494. The mixture of the materials was placed in a platinum crucible which was in turn placed in an electric furnace. The mixture was melted and stirred at 1,450° C. for 5 hours to obtain a homogeneous molten glass and then formed into a plate of 50×50×5 mm. The obtained plate was annealed and cooled to obtain a formed glass product.

The obtained formed glass product was heat treated at 570° C. for 3 hours and then at 780° C. for 2 hours to precipitate crystals in the glass. The surface of the formed glass-ceramic product was treated by lapping for 30 minutes by using a silicon carbide abrasive grains having an average grain diameter of 10 μm and then polished for 15 minutes by using a cerium oxide abrasive grains having an average grain diameter of 1 μm to obtain a polished product.

The obtained polished product had a large theoretical optical basicity because of the large content of $Li_2O$ and the small content of $Al_2O_3$. The decrease in weight in the water elution test of glass-ceramic in accordance with the grain test for chemical durability had a somewhat high value of $6.5 \times 10^{-7}$ g/cm$^2$·h.

COMPARATIVE EXAMPLE 3

Materials for the components were weighed and mixed together in such amounts that the glass composition had the following composition: $SiO_2$: 58.0% by weight, $Al_2O_3$: 7.0% by weight, $Li_2O$: 7.0% by weight, $K_2O$: 2.0% by weight, $TiO_2$: 2.0% by weight, $ZrO_2$: 4.0% by weight, $P_2O_5$: 1.8% by weight, $Sb_2O_3$: 0.2% by weight, $B_2O_3$: 4.0% by weight, MgO: 5.0% by weight, BaO: 6.0% by weight, and ZnO: 3.0% by weight. The glass composition had the following composition expressed in terms of % by mol: $SiO_2$: 59.67% by mol, $Al_2O_3$: 4.24% by mol, $Li_2O$: 14.48% by mol, $K_2O$: 1.31% by mol, $TiO_2$: 1.55% by mol, $ZrO_2$: 2.01% by mol, $P_2O_5$: 0.78% by mol, $Sb_2O_3$: 0.04% by mol, $B_2O_3$: 3.55% by mol, MgO: 7.67% by mol, BaO: 2.42% by mol, and ZnO: 2.28% by mol. The theoretical optical basicity of the glass composition was 0.5564. The mixture of the materials was placed in a platinum crucible which was in turn placed in an electric furnace. The mixture was melted and stirred at 1,450° C. for 5 hours to obtain a homogeneous molten glass and then formed into a plate of 50×50×5 mm. The obtained plate was annealed and cooled to obtain a formed glass product.

The surface of the formed glass product was treated by lapping for 30 minutes by using a silicon carbide abrasive grains having an average grain diameter of 10 μm and then polished for 15 minutes by using a cerium oxide abrasive grains having an average grain diameter of 1 μm to obtain a polished product. The polished product was dipped into a bath of molten sodium nitrate kept at 360° C. for 72 hours, and lithium ion in the surface layer of the glass was exchanged for sodium ion to chemically strengthen the polished product.

The obtained polished product had a decrease in weight in the water elution test of glass in accordance with the grain test for chemical durability as large as $17.5 \times 10^{-7}$ g/cm$^2$·h.

COMPARATIVE EXAMPLE 4

Materials for the components were weighed and mixed together in such amounts that the glass composition had the following composition: $SiO_2$: 66.0% by weight, $Al_2O_3$: 10.0% by weight, $Li_2O$: 8.0% by weight, $TiO_2$: 3.0% by weight, $ZrO_2$: 3.5% by weight, $P_2O_5$: 0.8% by weight, $Sb_2O_3$: 0.2% by weight, $B_2O_3$: 1.0% by weight, and MgO: 7.5% by weight. The glass composition had the followving composition expressed in terms of % by mol: $SiO_2$: 63.23% by mol, $Al_2O_3$: 5.65% by mol, $Li_2O$: 15.42% by mol, $TiO_2$: 2.16% by mol, $ZrO_2$: 1.64% by mol, $P_2O_5$: 0.32% by mol, $Sb_2O_3$: 0.04% by mol, $B_2O_3$: 0.83% by mol, and MgO: 10.71% by mol. The theoretical optical basicity of the glass composition was 0.5544. The mixture of the materials was placed in a platinum crucible which was in turn placed in an electric furnace. The mixture was melted and stirred at 1,450° C. for 5 hours to obtain a homogeneous molten glass and then formed into a plate of 50×50×5 mm. The obtained plate was annealed and cooled to obtain a formed glass product.

The surface of the formed glass product was treated by lapping for 30 minutes by using a silicon carbide abrasive grains having an average grain diameter of 10 μm and then polished for 15 minutes by using a cerium oxide abrasive grains having an average grain diameter of 1 μm to obtain a polished product. The polished product was dipped into a bath of molten sodium nitrate kept at 400° C. for 72 hours, and lithium ion in the surface layer of the glass was exchanged for sodium ion to chemically strengthen the polished product.

The obtained polished product had a decrease in weight in the water elution test of glass in accordance with the grain test for chemical durability as large as $9.9 \times 10^{-7}$ g/cm$^2$·h.

The results of Comparative Examples 1 to 4 are shown together in Table 4.

TABLE 4-1

| composition | Comparative Example 1 | | Comparative Example 2 | |
|---|---|---|---|---|
| | % by wt. | % by mol | % by wt. | % by mol |
| $SiO_2$ | 82.0 | 80.32 | 72.0 | 68.44 |
| $Al_2O_3$ | 5.5 | 3.18 | 3.0 | 1.68 |
| $Li_2O$ | 6.5 | 12.80 | 10.5 | 20.08 |
| $Na_2O$ | — | — | — | — |

TABLE 4-1-continued

| | | | | |
|---|---|---|---|---|
| $K_2O$ | — | — | 2.0 | 1.21 |
| $TiO_2$ | 0.5 | 0.37 | — | — |
| $ZrO_2$ | 4.0 | 1.91 | 3.0 | 1.39 |
| $P_2O_5$ | 0.5 | 0.21 | 1.8 | 0.72 |
| $Sb_2O_3$ | 0.2 | 0.04 | 0.2 | 0.04 |
| $As_2O_3$ | — | — | — | — |
| $B_2O_3$ | — | — | 3.5 | 2.87 |
| MgO | 0.8 | 1.17 | 2.0 | 2.83 |
| CaO | — | — | — | — |
| SrO | — | — | — | — |
| BaO | — | — | 2.0 | 0.74 |
| ZnO | — | — | — | — |
| PbO | — | — | — | — |
| theoretical optical basicity | | 0.5233 | | 0.5494 |
| condition of treatment | | | | 570° C. × 3h |
| | | | | 780° C. × 2h |
| crystalline phase 1 | | | | $Li_2O.2SiO_2$ |
| crystalline phase 2 | | | | α-quartz |
| crystalline phase 3 | | — | | — |
| degree of crystallization (% by volume) | | | | |
| crystalline phase 1 | | — | | 18 |
| crystalline phase 2 | | — | | 10 |
| crystalline phase 3 | | — | | — |
| decrease in wt. in water elution test (×10⁻⁷ g/cm² · h) | | — | | 6.5 |
| bending strength (MPa) | | — | | 230 |
| arithmetical mean roughness Ra (Å) | | — | | 16.0 |

TABLE 4-2

| | Comparative Example 3 | | Comparative Example 4 | |
|---|---|---|---|---|
| composition | % by wt. | % by mol | % by wt. | % by mol |
| $SiO_2$ | 58.0 | 59.67 | 66.0 | 63.23 |
| $Al_2O_3$ | 7.0 | 4.24 | 10.0 | 5.65 |
| $Li_2O$ | 7.0 | 14.48 | 8.0 | 15.42 |
| $Na_2O$ | — | — | — | — |
| $K_2O$ | 2.0 | 1.31 | — | — |
| $TiO_2$ | 2.0 | 1.55 | 3.0 | 2.16 |
| $ZrO_2$ | 4.0 | 2.01 | 3.5 | 1.64 |
| $P_2O_5$ | 1.8 | 0.78 | 0.8 | 0.32 |
| $Sb_2O_3$ | 0.2 | 0.04 | 0.2 | 0.04 |
| $As_2O_3$ | — | — | — | — |
| $B_2O_3$ | 4.0 | 3.55 | 1.0 | 0.83 |
| MgO | 5.0 | 7.67 | 7.5 | 10.71 |
| CaO | — | — | — | — |
| SrO | — | — | — | — |
| BaO | 6.0 | 2.42 | — | — |
| ZnO | 3.0 | 2.28 | — | — |
| PbO | — | — | — | — |
| theoretical optical basicity | | 0.5564 | | 0.5544 |
| condition of treatment | | $NaNO_3$ | | $NaNO_3$ |
| | | 360° C. × 72h | | 400° C. × 72h |
| crystalline phase 1 | | — | | — |
| crystalline phase 2 | | — | | — |
| crystalline phase 3 | | — | | — |
| degree of crystallization (% by volume) | | | | |
| crystalline phase 1 | | — | | — |
| crystalline phase 2 | | — | | — |
| crystalline phase 3 | | — | | — |
| decrease in wt. in water elution test (×10⁻⁷ g/cm² · h) | | 17.5 | | 9.9 |
| bending strength (MPa) | | 270 | | 260 |
| arithmetical mean roughness Ra (Å) | | 6.0 | | 6.5 |

As is shown by the results in Table 4, glass compositions having different compositions from that of the glass composition for magnetic disk substrates of the present invention were used in Comparative Examples 1 to 3. Melting of the glass composition was not possible in Comparative Example 1. Although the preparation of a magnetic disk substrate was possible, the decrease in weight in the water elution test of glass-ceramic in accordance with the grain test for chemical durability could not be suppressed sufficiently even after the crystallization was conducted by the heat treatment in Comparative Examples 2. A magnetic disk substrate having a small decrease in weight in the water elution test of glass in accordance with the grain test for chemical durability could not be prepared by the ion exchange in Comparative Example 3. The glass composition for magnetic disk substrates of Comparative Example 4 showed a large decrease in weight in the water elution test of the ion exchanged magnetic disk substrate because of the large theoretical optical basicity although the glass composition had the composition within the range of that of the glass composition of the present invention.

What is claimed is:

1. A magnetic disk substrate prepared by forming and polishing a glass composition for magnetic disk substrates comprising, expressed in terms of weight percent on the oxide basis:

from 66 to 80% $SiO_2$,
from 5 to 15% $Al_2O_3$,
from 3 to 8.5% $Li_2O$,
from 0 to 3% $Na_2O$,
from 0 to 3% $K_2O$,
from 0.5 to 8% $TiO_2$,
from 3.5 to 8% $ZrO_2$,
from 0.5 to 3% $P_2O_5$,
from 0 to 2% $Sb_2O_3$, and
from 0 to 2% $As_2O_3$, wherein the total of the contents of $Li_2O$, $Na_2O$ and $K_2O$ is from 3 to 10%, and having a theoretical optical basicity of 0.548 or less, and strengthening the formed and polished glass composition by ion exchange of alkali metal ions in the surface layer of the glass composition for alkali metal ions having larger ionic radii at a temperature of from 350° to 550° C.

2. A magnetic disk substrate according to claim 1, comprising, expressed in terms of weight percent on the oxide basis:

from 66 to 75% $SiO_2$,
from 5.5 to 10% $Al_2O_3$,
from 4 to 8.5% $Li_2O$,
from 0 to 2% $Na_2O$,
from 0 to 2% $K_2O$,
from 2 to 6% $TiO_2$,
from 3.8 to 6.5% $ZrO_2$,
from 1 to 2.5% $P_2O_5$,
from 0 to 2% $Sb_2O_3$, and
from 0 to 2% $As_2O_3$, wherein the total of the contents of $Li_2O$, $Na_2O$ and $K_2O$ is from 4 to 9%, and having a theoretical optical basicity of 0.548 or less.

3. A magnetic disk substrate according to claim 1, comprising, expressed in terms of weight percent on the oxide basis:

from 66 to 75% $SiO_2$,
from 5.5 to 7.5% $Al_2O_3$,
from 5 to 8.5% $Li_2O$, from 0 to 2% $Na_2O$,
from 0 to 2% $K_2O$,
from 2 to 4% $TiO_2$,
from 4.1 to 6% $ZrO_2$,
from 1 to 2.5% $P_2O_5$,
from 0 to 1% $Sb_2O_3$, and
from 0 to 1% $As_2O_3$, wherein the total of the contents of $Li_2O$, $Na_2O$ and $K_2O$ is from 5 to 9%, and having a theoretical optical basicity of 0.548 or less.

4. A magnetic disk substrate which is prepared by forming, heating treating, and polishing a glass composition for magnetic disk substrates comprising, expressed in terms of weight percent on the oxide basis:

from 66 to 80% $SiO_2$,
from 5 to 15% $Al_2O_3$,
from 3 to 8.5% $Li_2O$,
from 0 to 3% $Na_2O$,
from 0 to 3% $K_2O$,
from 0.5 to 8% $TiO_2$,
from 3.5 to 8% $ZrO_2$,
from 0.5 to 3% $P_2O_5$,
from 0 to 2% $Sb_2O_3$, and
from 0 to 2% $As_2O_3$, wherein the total of the contents of $Li_2O$, $Na_2O$ and $K_2O$ is from 3 to 10%, and having a theoretical optical basicity of 0.548 or less, and has a main crystalline phase comprising at least one kind selected from the group consisting of $Li_2O \cdot 2SiO_2$ and spodumene.

5. A magnetic disk substrate as claimed in claim 4, comprising, expressed in terms of weight percent on the oxide basis:

from 66 to 75% $SiO_2$,
from 5.5 to 10% $Al_2O_3$,
from 4 to 8.5% $Li_2O$,
from 0 to 2% $Na_2O$,
from 0 to 2% $K_2O$,
from 2 to 6% $TiO_2$,
from 3.8 to 6.5% $ZrO_2$,
from 1 to 2.5% $P_2O_5$,
from 0 to 2% $Sb_2O_3$, and
from 0 to 2% $As_2O_3$, wherein the total of the contents of $Li_2O$, $Na_2O$ and $K_2O$ is from 4 to 9%, and having a theoretical optical basicity of 0.548 or less.

6. A magnetic disk substrate as claimed in claim 4, comprising, expressed in terms of weight percent on the oxide basis:

from 66 to 75% $SiO_2$,
from 5.5 to 7.5% $Al_2O_3$,
from 5 to 8.5% $Li_2O$,
from 0 to 2% $Na_2O$,
from 0 to 2% $K_2O$,
from 2 to 4% $TiO_2$,
from 4.1 to 6% $ZrO_2$,
from 1 to 2.5% $P_2O_5$,
from 0 to 1% $Sb_2O_3$, and
from 0 to 1% $As_2O_3$, wherein the total of the contents of $Li_2O$, $Na_2O$ and $K_2O$ is from 5 to 9%, and having a theoretical optical basicity of 0.548 or less.

7. A magnetic disk substrate according to claim 4, wherein the total degree of crystallization is 20% by volume or more.

8. A magnetic disk substrate according to claim 5, wherein the total degree of crystallization is 20% by volume or more.

9. A magnetic disk substrate according to claim 6, wherein the total degree of crystallization is 20% by volume or more.

10. A magnetic disk substrate according to claim 1, wherein decrease in weight is $6 \times 10^{-7}$ $g/cm^2 \cdot h$ or less in a water elution test of a glass in accordance with the grain test for chemical durability.

11. A magnetic disk substrate according to claim 2, wherein decrease in weight is $6 \times 10^{-7}$ $g/cm^2 \cdot h$ or less in a water elution test of a glass in accordance with the grain test for chemical durability.

12. A magnetic disk substrate according to claim 3, wherein decrease in weight is $6 \times 10^{-7}$ $g/cm^2 \cdot h$ or less in a water elution test of a glass in accordance with the grain test for chemical durability.

13. A magnetic disk substrate according to claim 4, wherein decrease in weight is $6 \times 10^{-7}$ $g/cm^2 \cdot h$ or less in a water elution test of a glass-ceramic in accordance with the grain test for chemical durability.

14. A magnetic disk substrate according to claim 5, wherein decrease in weight is $6 \times 10^{-7}$ $g/cm^2 \cdot h$ or less in a water elution test of a glass-ceramic in accordance with the grain test for chemical durability.

15. A magnetic disk substrate according to claim 6, wherein decrease in weight is $6 \times 10^{-7}$ $g/cm^2 \cdot h$ or less in a water elution test of a glass-ceramic in accordance with the grain test for chemical durability.

16. A magnetic disk substrate according to claim 7, wherein decrease in weight is $6 \times 10^{-7}$ $g/cm^2 \cdot h$ or less in a water elution test of a glass-ceramic in accordance with the grain test for chemical durability.

17. A magnetic disk substrate according to claim 8, wherein decrease in weight is $6 \times 10^{-7}$ $g/cm^2 \cdot h$ or less in a water elution test of a glass-ceramic in accordance with the grain test for chemical durability.

18. A magnetic disk substrate according to claim 9, wherein decrease in weight is $6 \times 10^{-7}$ $g/cm^2 \cdot h$ or less in a water elution test of a glass-ceramic in accordance with the grain test for chemical durability.

* * * * *